United States Patent [19]
Spina

[11] Patent Number: 5,620,722
[45] Date of Patent: Apr. 15, 1997

[54] EXTRUSION HEAD FOR BLOW MOLDING

[75] Inventor: Dennis R. Spina, Onsted, Mich.

[73] Assignee: Hoover Universal, Inc., Plymouth, Mich.

[21] Appl. No.: 538,721

[22] Filed: Oct. 3, 1995

[51] Int. Cl.[6] .......................... B29C 47/20; B29C 49/04
[52] U.S. Cl. .................. 425/532; 261/209.8; 261/541; 425/380; 425/465; 425/467
[58] Field of Search .................... 425/465, 467, 425/532, 380; 264/541, 209.8, 167

[56] References Cited

U.S. PATENT DOCUMENTS

| | | | |
|---|---|---|---|
| 3,114,932 | 12/1963 | Donnelly | 425/532 |
| 3,309,443 | 3/1967 | Scott, Jr. et al. | 425/532 |
| 3,608,137 | 9/1971 | Wilson | 425/465 |
| 3,914,366 | 10/1975 | Wilson | 425/465 |
| 3,981,672 | 9/1976 | Wilson | 425/467 |
| 4,304,826 | 12/1981 | Kendall et al. | 264/521 |
| 4,496,301 | 1/1985 | Mozer et al. | 425/532 |
| 4,650,629 | 3/1987 | Mozer et al. | 264/541 |
| 4,735,834 | 4/1988 | Mozer et al. | 428/35 |
| 4,751,651 | 6/1988 | Bryan | 364/473 |
| 4,869,862 | 9/1989 | Bryan | 425/532 |
| 5,057,267 | 10/1991 | Seizert et al. | 425/465 |
| 5,486,333 | 1/1996 | Mavridis et al. | 425/465 |

FOREIGN PATENT DOCUMENTS

| | | | |
|---|---|---|---|
| 153961 | 2/1982 | Germany | 425/467 |
| 43-23333 | 10/1968 | Japan | 425/532 |
| 61-63408 | 4/1986 | Japan | 425/461 |

*Primary Examiner*—Robert Davis
*Attorney, Agent, or Firm*—Harness, Dickey & Pierce, P.L.C.

[57] ABSTRACT

An extrusion head for extruding a polymer into a parison for blow molding and including a die ring and a mandrel. The die ring and mandrel each include a frustoconical portion. One frustoconical portion is shaped over its full length to define an ovalized annular outlet. The frustoconical portion is also shaped over less than its full length with a recess that is rotationally offset from the first and generally located upstream therefrom. The shapings result in the prison being extruded in a controlled manner through the outlet orifice with a predetermined area of increased thickness.

16 Claims, 2 Drawing Sheets

EXTRUSION HEAD FOR BLOW MOLDING

BACKGROUND AND SUMMARY OF THE INVENTION

This invention generally relates to the blow molding of plastic articles. More particularly, the invention relates to an improved extrusion head for producing a plastic parison that is used in blow molding plastic articles having non-circular cross-sections. The resulting parison has a varied distribution of the plastic material about the parison side wall.

Blow molding is well known technique where a hollow plastic parison is clamped within a mold and then blown or expanded outward into contact with the molding surfaces to form an article of the desired shape. The parison itself is formed by an extrusion process and numerous examples of blow molded articles can be cited for illustrated purposes. However, the most well known and easily recognized blow molded articles are probably, the, various types of liquid and beverage containers. Several specific examples include liquid detergent containers, one gallon milk jugs and motor oil containers. These examples are most often formed from high density polyethylene (HDPE) but other polymer materials are also used.

The typical extruded parison has an annular cross-section and a substantially constant wall thickness. This is usually good for forming containers having generally annular or circular cross-sections. However, when an article having a non-circular cross-section is blow molded from such a parison, those portions of the parison wall which subsequently form the corners of the article are subjected to the maximum elongation, expansion and stretch experienced by the parison. These portions are therefore thinner and weaker than the remaining sections of the article, even though their shape necessitates greater strength.

To ensure that these corners nave a sufficient wall thickness, the parison can be extruded with an increased wall thickness. Obviously, in and of itself, this will result in the remaining portions of the article also having an increased thickness. The resulting article therefore consumes more material than is actually needed, is heavier than desired and more costly to produce.

In attempting to solve the problems of side wall thickness variances and excessive material usage, parisons have been extruded with non-circular cross-sectional shapes, elliptical for example. Parisons have also been extruded with non-uniform wall thicknesses. A problem associated with the latter is that, in order to produce non-uniform wall thicknesses, non-uniform rates of extrusion are introduced into the molten plastic material. As the material exits the extrusion die head, it is often seen that the different extrusion rates cause the parison to close, collapse, curtain, wrinkle or twist. These are not just the result of varying material flow rates, but also a result of the inherent "bounce-back" or parison "swell" exhibited during discharge of the molten plastic. Before discussing parison swell in more detail, it is believed that a brief discussion of polymer flow characteristics would be of benefit.

Polymer materials flow in a viscous, an elastic or a visco-elastic fashion. Which particular flow depends on the nature of the polymer, polymer temperature, the degree of applied force, and the period of time over which the flow is maintained. Melted polymer materials under typical molding process conditions usually exhibit the characteristics of viscous flow and elastic flow simultaneously, that is, visco-elastic flow.

In viscous flow the polymer material continues and is deformed as a force is applied to it. When the force is removed the deformation remains. The rate of deformation is proportional to the force.

During elastic flow the polymer material deforms into a new shape and holds that shape as long as the force is applied. When the force is removed, the material returns to its original shape. This deformation is proportional to the force.

The viscous component of visco-elastic flow predominates in the processing of most melted polymer materials. However, the elastic component plays an important role and is the cause of the parison swell created during the discharge of the parison from the extrusion head. Process and polymer conditions which influence swell include, but are not limited to, higher extrusion pressures, lower melt temperatures, shorter tooling lands, higher polymer molecular weights, broader polymer molecular weight distributions, and larger extrusion internal head diameters relative to the die and mandrel diameters. All of the conditions tend to increase parison swell.

Parison swell occurs in two areas of the parison. The first is what the industry refers to as diameter swell. In diameter swell, the diameter of the resulting parison is larger than the orifice diameter created by the die and mandrel. The second is generally referred to as weight swell. With weight swell, the wall thickness of the parison is thicker than the orifice gap created by the die and mandrel.

Time is an important consideration in the amount of parison swell. A polymer will respond with a mostly elastic reaction when the force is applied quickly for a very short period of time. On the other hand, a polymer will respond with a mostly viscous reaction when the force is applied slowly for an extended period of time.

During discharge, the polymer material is in the die/mandrel gap area for a very short period of time. Moments earlier, up-stream in the extrusion head, this polymer held some other shape for a relatively longer period of time. This earlier shape is always thicker and usually larger in diameter than the die/mandrel orifice. Once the polymer discharges from the die/mandrel orifice, the elastic flow component attempts to return the material partially back to the earlier larger shape. In other words parison swell occurs.

If the die/mandrel lands are long the material will begin to assume the new shape of the die/mandrel orifice and gap. The viscous flow component becomes more predominant and the parison swell is reduced. Long narrow die/mandrel gap also creates a restriction that retards the parison flow rate.

One way to extrude a thicker section into a specific area of the parison wall is shape the surfaces of the die or mandrel (or both) of the extrusion head. This is generally referred to as die shaping. Die shaping consists of widening the die orifice or die gap in that area where the resulting thicker portion of the parison will correspond to the appropriate section of the article in need of a thicker wall portion. A portion of the die orifice is widened by machining the appropriate thickness out of the land of either the die ring or mandrel while running out or smoothly decreasing the depth of this cut in a circumferential progression away from the maximum gap portion.

One type of die shaping, know as parallel land die shaping, is a very effective way of changing the thickness of the parison by enlarging the die/mandrel gap in selected areas. During parallel land die shaping, a portion of the die is shaped at the same angle as the original land and over the entire axial land length. The parison flow rate through the die/mandrel gap and the parison swell is greatest where the die shaping is positioned and retarded where the die shaping is not positioned. These different parison flow rates and swells create forces within the parison as the parison is discharged and the forces cause the parison to significantly change its cross-section shape and possibly cause the parison to close or collapse.

Another type of shaping, often referred to as partial or 2/3 land die shaping or ovalization, changes the thickness of the parison by using the elastic flow component. Flow is more consistent throughout the die/mandrel gap area and parison. Swell, particularly weight swell, is greatest in the shaped areas. Compared to parallel land shaping, the 2/3 land shaping approach is limited in the degree of change possible in the parison wall thickness. Nonetheless, the approach allows control of the discharge to be maintained at all times. Parison collapse does not often occur, and the parison is thicker where the 2/3 shaping is positioned. In 2/3 die shaping, the die is shaped at an angle greater than the land angle. The shaping, however, proceeds over less than the full length of the land.

With both varieties of shaping, the consensus of the industry, in a free drop parison situation, is that the pattern of ovalization must be symmetrical about the die gap in order to balance the forces created by the flow of the polymer material at various points around the die and mandrel discharge orifice.

During die shaping, the depth of the cut, the length of the cut relative to the land, the width of the cut, the shear rate and other specific properties of the plastic resin are all factors which must be considered in shaping the die ring and mandrel for a specific article. The process itself is an art and heavily relies on prior designer/operator experience to achieve satisfactory parisons and articles. If the depth of the cut is too deep relative to the overall die gap, the parison may collapse or close off at its free end as a result of unequal resin flow out of the discharge orifice. If not deep enough, insufficient parison thickness results as portions of the blown article are too thin.

While the above die shaping may have resulted in some success in the ability to extrude parisons having varied wall thicknesses, when blow molding light weight containers, such as one gallon milk jugs, poor parison control has resulted. In light weight containers, an attempt is made to have those portions of the parison which will form the container side walls as thin as possible while ensuring a sufficient amount of material, for container structural reasons, in those portions of the parison which will form the corners of the container. If the thickness variations between the side wall forming portions and the corner forming portions of the parison are too large, the parison will be uncontrolled during extrusion. This is all a function of the depth of the shaping. It is generally known that the maximum depth of the shaping for a lightweight container, such as a milk bottle, which can be put into the die is about 0.0015 to 0.001 inches or about 40% of the die gap. Larger amounts of shaping have been seen to result in localized flow differences which produce an uncontrollable parison drop.

From the above, it can be seen that there still exists a need for a better die shaping technique in order to allow for the blow molding of lighter weight containers.

With the above in mind, it is an object of the present invention to provide a shaped die head that will produce a parison for blow molding light weight containers. An object of the present invention is to provide a shaped die head which will produce a parison with increased thickness wall sections at predetermined locations and which can be controlled during is drop from the extrusion head.

A further object of this invention is to provide a shaped die or mandrel in the die head which allows for larger amounts of ovalization and, therefore, the benefit of thinner side wall sections.

Yet another object of this invention is to provide a shaped die which utilized the visco-elastic properties of the extruded material to manipulate the swell experienced by the plastic material as it exits from the outlet opening of the extrusion head.

In achieving the above and other objects, the present invention provides a shaped die head for use in an extrusion blow molding process. The die head includes a die ring having interior surfaces that define a longitudinally extending bore. Positioned within this bore is a mandrel that, together with the die ring, cooperates to define a flow passageway for the molten plastic material, which can be one of the many plastics, but most commonly HDPE. Both the mandrel and the die ring include frustoconical portions at their outlet ends and these portions cooperate to define the annular outlet orifice or die gap through which the parison is finally extruded.

The invention combines the parallel land and 2/3 land die/mandrel shaping techniques in a single die to allow a greater overall polymer material redistribution in the parison than that possible with each technique individually. All this is done while maintaining control of parison discharge from the extrusion head. This parison material distribution permits a more desirable material distribution in the final blow molded article.

The parallel land shaping cut into the extrusion head tooling essentially controls the degree of polymer material redistribution in the resulting parison. The amount of this shaping, provided as a percentage of the die/mandrel gap, exceeds what normally would be acceptable from a process control perspective. To regain control, 2/3 land shaping is cut into the head tooling circumferentially off-set from the parallel land shaping at a point equally distant from the next parallel land shaping. The 2/3 land shaping does not change the die/mandrel gap in this area, but it does decrease land length which in turn increases parison diameter, weight swell and flow in this area. The localized swell increase slightly reduces the overall shaping effect of the tooling while the localized flow increase greatly improves the overall control of the parison discharge. The net result is a greater degree of shaping while maintaining discharge control.

It should be apparent that the parallel land shaping can be circumferentially cut in one, two, three, four, or more places around the die/mandrel orifice. In the case of one parallel land shaping, one 2/3 land shaping is placed 180 degrees opposite. In the cases of additional parallel land shapings, the off-set 2/3 land shaping is placed between each circumferential pair of parallel land shapings.

While referred to as 2/3 land shapings, it is to be understood that the "2/3" designation is not intended to place a numeric or relational constraint on the length of the second shapings relative to the land length of the frustoconical portion. This designation is only used to show that the length of the second shapings relative to the land length of the frustoconcial portion is less than that of full or parallel land shaping.

According to one embodiment of the present invention, the outlet orifice or die gap is formed with a pair of generally opposed shapings. The shapings extend the full land length of the die and are formed at the same land angle. This parallel land shaping provides for thickened areas in the corner forming portions of the parison. These portions will undergo maximum stretching and expansion during blow molding of the article.

A second set of opposed shapings, herein referred to as flow compensation recesses, are formed in the upstream end of the die ring's frustoconical portion. The flow compensation recesses are circumferentially offset from the first set of shapings by approximately 90° and are formed as partial or 2/3 land shapings.

These second shapings compensate for the increased flow which will subsequently result from the first ovalizations of the die ring. In other words, this second set of recesses increases the flow of molten plastic material in offset areas in anticipation of the increased flow which the first set of ovalizations will subsequently produce. The result is that all of the extruded material, when extruded out through the outlet orifice, flows at substantially the same rate allowing control to be maintained.

The first and second shapings work together to manipulate the swell produced by the visco-elastic properties of the extruded plastic material. In this manner, less swell occurs in the side wall forming portions of the parison and these portions are therefore thinner. The result is a varying wall thickness having a good distribution of the polymeric material about the parison and without the control problems previously seen during the parison drop.

Depending on the actual article configuration, the combination of compensation and ovalizations described above can be provided in alternative embodiments. These alternative embodiments are more fully described below.

As a result of the above combination of shapings and the resulting effect on parison swell, it has been found that larger amounts of shaping than previously seen, above 40% and even approaching 150% of the die gap, are possible. This allows for a reduction in overall container weight by decreasing the side wall thickness without compromising the corner thickness of the container which in turn increases the tensile and loading strength of the container. Furthermore, it has been found that it is now possible to provide a parison having an asymmetrical wall thickness which will still drop in a straight and satisfactory manner out of the parison extrusion head.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE PREFERRED EMBODIMENT

Figure 1:
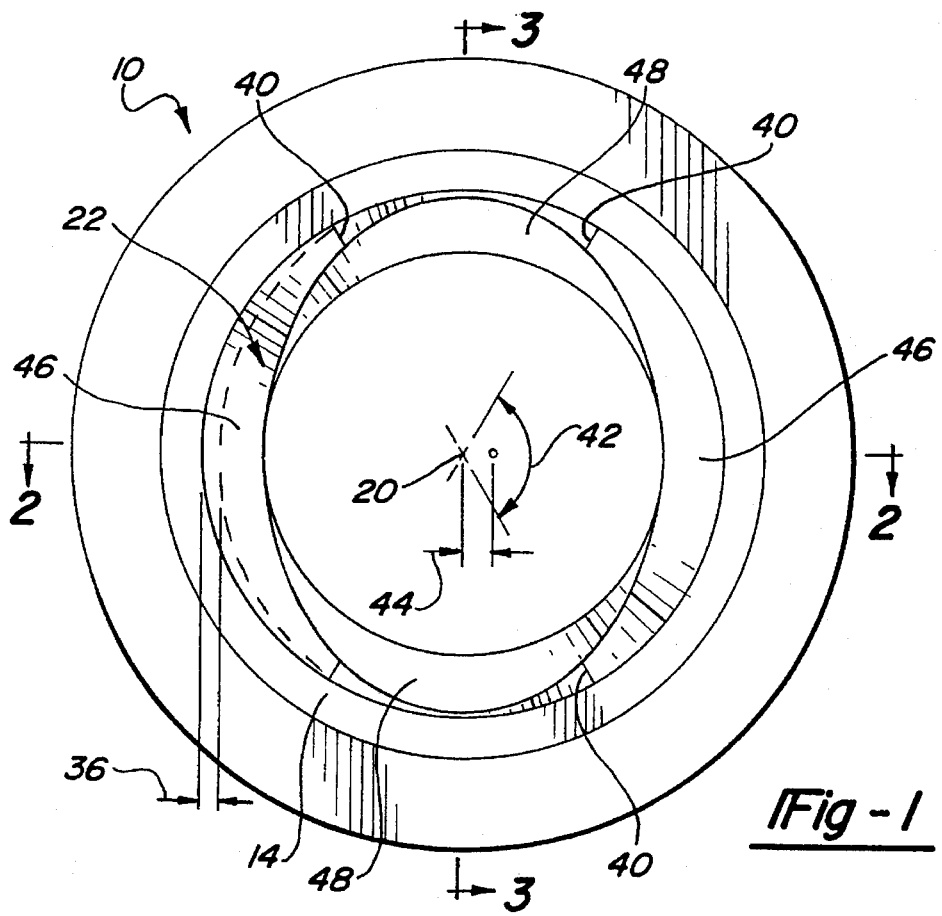
FIG. 1 is an end elevational view of a die ring illustrating one embodiment of the present invention.

Referring now to the drawing, a die ring (hereinafter just "die") embodying the principles of the present invention is generally illustrated in FIG. 1 and designated at 10. The die 10 is a portion of an extrusion head (not shown) used for extruding molten plastic into a parison (not shown). While the present invention is specifically illustrated and discussed in connection with a die 10, it should be understood and appreciated that the principles of the present invention are equally applicable to the shaping of a mandrel 12 positioned within an unshaped die 10. The principles of this invention could also be utilized in connection with either convergent or divergent (divergent being specifically illustrated and discussed) die head assemblies.

Figure 2:
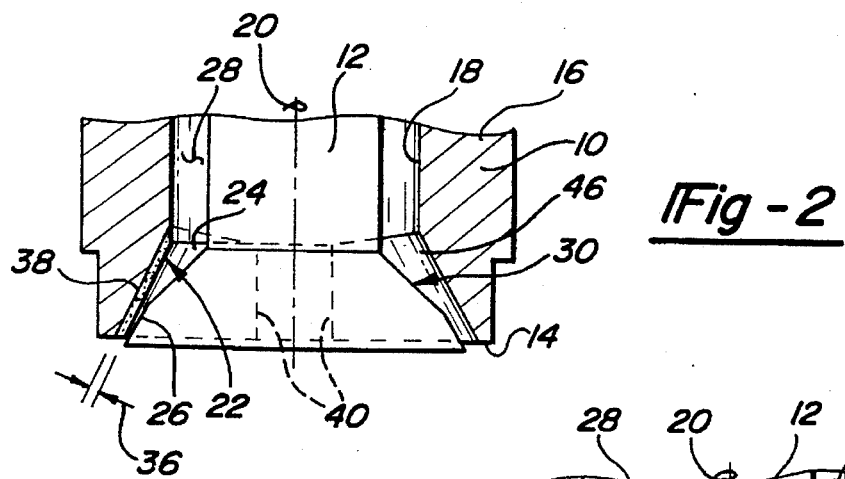
FIG. 2 is a sectional view taken substantially along line 2—2 in FIG. 1 showing only the first set of shapings of the die ring and showing the mandrel located within the die ring.
Figure 3:
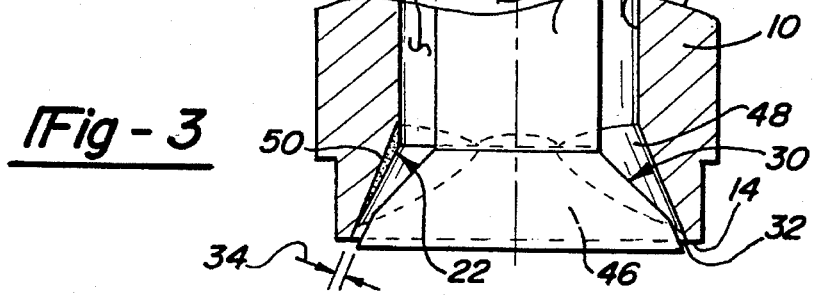
FIG. 3 is a sectional view taken substantially along line 3—3 in FIG. 1 illustrating both the first and second sets of shapings according to the principles of the present invention.

As seen in FIGS. 1–3, the die 10 generally includes a first end 14, a second end 16, and interior surfaces which define a bore 18 extending longitudinally through the die 10 along a longitudinal axis 20. The bore 18 is formed into a frustoconical portion 22 located generally adjacent the first end 14 of the die 10. Shown as being divergent from the axis 20, the frustoconical portion 22 diverges as it progresses toward the first end 14 of the die 10. The frustoconical portion 22 itself includes an upstream or first end 24 and an outlet or second end 26 which terminates at and coincides with the first end 14 of the die 10.

The mandrel 12 is coaxially located within the bore 18 of the die 10 so that an annular passageway 28 is defined between the die 10 and mandrel 12. However, if desired, the axis of the mandrel 12 can be offset with respect to the axis 20 of the die 10. The mandrel 12 is also formed in the shape of a divergent frustoconical portion 30.

Molten plastic is extruded through the annular passageway 28 between the die 10 and the mandrel 12 and is exited through an annular outlet orifice 32 defined between the frustoconical portion 22 of the die 10 and the frustoconical portion 30 of the mandrel 12. The width between the lands of the frustoconical portions 22 and 30 at the outlet orifice 32 defines the die gap 34.

When extruded, the resulting parison will exhibit a certain amount of swell or bounce-back immediately after exiting the outlet orifice 32 and will then drop away from the orifice 32. If the die gap 34 was of a constant width about the central axis 20, the resulting parison will have a substantially constant wall thickness. If a container having an annular or circular cross section was subsequently blow molded, as a result of the equidistance stretching of the parison, the container walls will also have a constant thickness.

If the blow molded article is not circular or annular in cross-section, then the wall thickness will vary and the corners of such a container will exhibit a decreased thickness relative to the remaining wall sections. This is a result of the corners being stretched a greater distance than the interposed wall sections.

One way of obtaining corners with the desired thickness is to increase the overall thickness of the initial parison as discussed above. Unfortunately, this results in the side wall portions having a thickness which is greater than actually needed. Additionally, the amount of material used to form the container is increased as is the weight of the container. All of these are undesirable from a manufacturing stand point because they increase the costs associated with the resulting container. Obviously there exists a need for a lighter weight container, one using less material.

In order to form light weight, circular or non-circular, blow molded articles, the present invention extrudes a parison having a varying wall thickness. In so doing, the present invention allows the thickness of the side wall to be decreased while still providing an increased and appropriate amount of material for those portions which will form the corners of the article. Previously, in maintaining the appropriate thickness in the corners there was a practical limit as to how thin the side walls could be made. This was a function of the amount of shaping which could be formed in the die head and gap without adversely affecting control of the parison. When control is lost, the parison begins to exhibit an uneven drop of the molten material resulting in waviness, curtaining and, in extreme cases, closing off the open end of the parison as it drops away from the head. This lack of control during the parison drop is a result of uneven flow rates of the molten plastic out of the die gap as well as a result of the swell exhibited by the molten plastic as it leaves the extrusion head. The amount of swell depends on the visco-elastic properties of the polymer being used, which in turn is partly a result of the molecular weight of the polymer, the molecular weight distribution of the polymer, the dwell time within the extrusion head, the rate of flow in the extrusion head and, among other conditions, the land length of the tooling.

A briefly mentioned above, the die head, or more particularly the die 10 is shaped to allow the parison to be extruded out of the exit orifice 32 at a substantially even flow rate therearound. Those portions of the parison which will form the corners of the resulting container exhibit an increased thickness relative to those portions forming the side walls of the resulting container.

In FIG. 2, the die 10 is shown both before and after the first set of shapings have been cut into the die 10. On the left half of the figure, the die 10 is shown prior to shaping. On the right half of the figure, the die 10 is shown after shaping. In FIG. 3, the die 10 is shown with the first set of shapings already formed and also both before and after the second shapings have been cut into the die 10. On the left half of the figure, the die 10 is again shown prior to shaping, while on the right half the die 10 is shown after shaping.

Referring now to the left, unshaped portion of FIG. 2, it can be seen that the amount of shaping 36 is represented as an increase in the radial distance from the central axis 20 as a result of the machining of the frustoconical portion 22 of the die 10. Previously shaped parisons became uncontrollable when the shaped die gap 36 approached and went beyond 40% of the unshaped die gap 34. With the present invention, it has been found that the present novel combination allows these shapings 36 to be above 40% of the die gap 34 and even approach 150% greater than the die gap 34. However, the invention is not limited to these larger amounts of shapings.

The material removed during ovalizing, designated by the cross-hatching 38, is done so at an angle which corresponds to the angle of the frustoconical portion 22 of the die and extends the full land length of the frustoconical portion 22. The first shapings are therefore referred to as full land or parallel land shapings 46. Proceeding circumferentially from the maximum depth of the shaping 46, it can be seen that the depth of the shaping 36 is smoothly decreased and circumferentially run-out in order to merge into the original surface forming the frustoconical portion 22. The end of the run-out is generally designated as dashed line 40 in FIG. 2. In actual practice, this line 40 might be visually imperceivable to the naked eye. The run-out lines 40 cooperate to define an included angle 42, as seen in FIG. 1 within which the shaping 46 is defined.

In forming this ovalized portion, the grinding or shaping machine is provided with an initial off-set 44 so that during machining of the die 10, the included angle 42 can be varied with respect to the amount of ovalization 36 which is desired. As seen in the embodiment of FIG. 1, the first shapings 46 are provided as a pair of shapings 46 located 180° apart from one another on opposing sides of the die 10.

A second set of recesses or shapings 48 are also formed in the die 10. These are herein referred to as flow compensation recesses 48. In the embodiment of FIG. 1, the recesses 48 are directly opposed from one another and oriented 90° from the first set of shapings 46.

The second set of recesses 48 are formed in the upstream end 24 of the frustoconical portion 22 at a die back angle which is greater than the angle of the frustoconical portion 22 and, therefore, over less than the full land length of the frustoconical portion 22. This maintains the normal non-ovalized tooling geometry at the outlet. As seen in the left side of FIG. 3, the material which is removed from the die 10 in forming the second recesses 48 is generally designated as a cross-hatched portion 50.

As with the first shapings 46, the depth of the second recesses 48 are run-out circumferentially about the die 10 until merging into the frustoconical portion 22. A portion of the second recesses 48 can, as illustrated, overlap a portion of the ovalizations 46.

During forming of the parison, molten plastic resin flows through the passageway 28 defined between the die 10 and mandrel 12. Upon reaching the parallel land shapings 46 or first ovalizations, the flow rate of the molten plastic experiences an increase. If not countered, the increased flow rate through the first shapings 46 would result in a channeling of the plastic material from the non-ovalized areas into these shapings 46 and uneven extrusion rates. In response, an increased amount of plastic material would be extruded out of the shapings 46 of the die gap 34 at the expense of material in the non-ovalized areas. An uncontrollable parison would result. With the present invention, the second set of recesses 48 operate as flow compensators in order to increase the flow rate of the plastic material in areas which will compensate for the increased flow rate caused by the shapings 46. This in turn reduces the tendency of the plastic to channel into the ovalizations 46. It also allows for a thinner section to be formed in the parison than could be otherwise formed. Shapings 46 of greater than 40%, and even 150%, of the die gap 34 are possible with the present invention since it allows for reduced channeling and equalized flow rates around the annular opening 32. The change in the effective land length which results from the flow compensating recesses 48 also operates to provide a control on the amount of swell which will be experienced by the extruded plastic exiting from the recesses 48 as well as between the recesses 48 and ovalizations 46. This in turn leads to an ability to control the thicknesses of the side wall forming portions of the parison, those areas other than those formed by the ovalizations 46.

Figure 4:
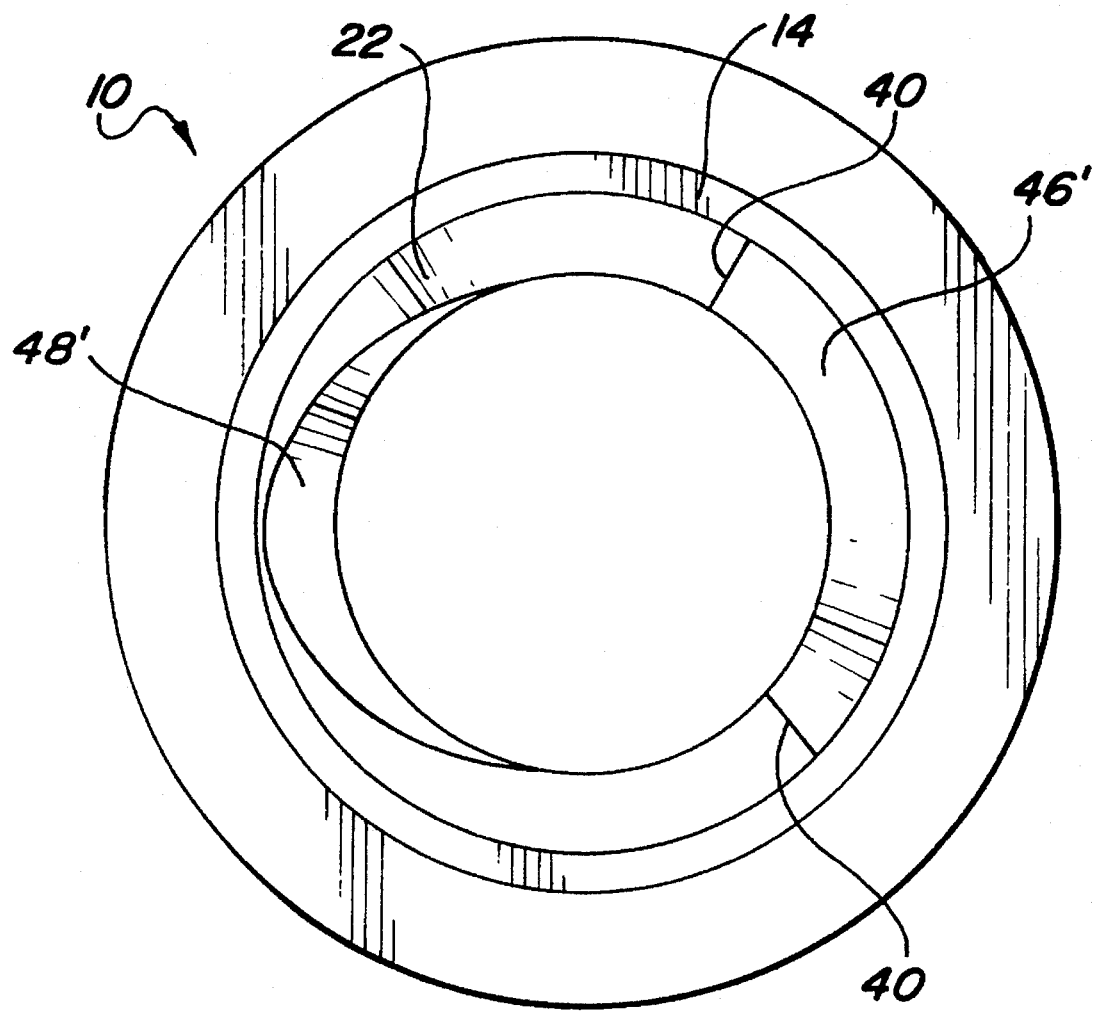
FIG. 4 is an end elevational view similar to that of FIG. 1 illustrating a die ring having shapings according to a second embodiment of the present invention.

Referring now to FIG. 4, the die 10 is shown with a second embodiment of the present invention incorporated therein. As seen in this embodiment, a single full land ovalization 46' is located in the frustoconical portion 22 of the die 10 so as to be directly opposed by the flow compensating recess 48'. In this embodiment, the flow compensating recess 48' offsets any channeling which would result from the provision of the ovalization 46' in the frustoconical portion 22 of the die 10. As a result and by manipulating the effective land length of the flow compensation recess 48', a parison can be extruded utilizing the illustrated die 10 wherein one section of increased thickness will be formed in the parison generally opposed from one another.

Depending on the particular shape of the desired article or container, the principles of the present invention can be utilized in shaping a die 10 so that the resulting container can be made in a lighter weight while still providing for a sufficient amount of material for structural integrity in the corners of the container. For example, four ovalizations and compensation recesses could be used in an appropriate situation.

While the above description constitutes the preferred embodiment of the present invention, it will be appreciated that the invention is susceptible to modification, variation and change without departing from the proper scope and fair meaning of the accompanying claims.

I claim:

1. An improved extrusion head for extruding a molten plastic material into a parison for blow molding articles having increased thickness sections, said improvement comprising:

a die ring having a first end, a second end, and interior surfaces defining a bore extending from said first end to said second end along a longitudinal axis, said interior surfaces further defining a generally frustoconical portion in said bore and located adjacent to said second end, said frustoconical portion including an upstream end and an outlet end;

a mandrel positioned within said bore of said die ring and cooperating with said bore to define a passageway therebetween, said mandrel including a first end, a second end and exterior surfaces defining a generally frustoconical portion adjacent said second end, said frustoconical portion having an upstream end and an outlet end, said outlet end being located adjacent to said second end of said mandrel, said frustoconical portion being defined by exterior surfaces such that said frustoconical portion of said mandrel generally corresponds with said frustoconical portion of said die ring and cooperates to define a generally annular outlet orifice through which polymer is extruded in the form of a parison;

a first shaping formed in said outlet end of one of said frustoconical portions, said first shaping being formed at substantially the same angle as said frustoconical portion and extending the full land length thereof, said first shaping providing said outlet orifice with a generally ovalized shape, said first shaping defining a maximum amount of ovalization and circumferentially progressing with a decreasing amount of ovalization until smoothly merging with said frustoconical portion;

second shaping formed in said upstream end of one of said frustoconical portions, said second shaping being rotationally offset from said first shaping and being formed at an angle other than the back angle of said frustoconical portions, said second shaping extending less than the full land length of said frustoconical portion, said second shaping defining a maximum amount of ovalization and circumferentially progressing with a decreasing amount of ovalization until smoothly merging with said frustoconical portion whereby said first and second shapings result in a parison being extruded through said outlet orifice in a controlled manner and with a predetermined area of increased thickness resulting from said first shaping.

2. The improvement of claim 1 wherein said frustoconical portions define a diverging portion of said bore.

3. The improvement of claim 1 wherein said first shaping is formed in said die ring.

4. The improvement of claim 1 wherein said second shaping is formed in said die ring.

5. The improvement of claim 1 including more than one first shaping.

6. The improvement of claim 5 wherein said more than one shapings are formed in said die ring.

7. The improvement of claim 5 wherein said more than one shapings are equidistantly spaced about said frustoconical portion.

8. The improvement of claim 1 including more than one second shaping.

9. The improvement of claim 8 wherein said more than one second shapings are formed in said die ring.

10. The improvement of claim 8 wherein said more than one second shapings are equidistantly spaced about said frustoconical portion.

11. The improvement of claim 1 including more than one first shaping and more than one second shaping.

12. The improvement of claim 11 wherein said first and second shapings are equidistantly spaced about said frustoconical portion.

13. The improvement of claim 11 wherein said first and second shapings overlap one another.

14. The improvement of claim 1 wherein said amount of ovalization is greater than 40% of said die gap.

15. The improvement of claim 1 wherein said amount of ovalization is greater than 50% of said die gap.

16. The improvement of claim 1 of ovalization approaches 150% of the die gap.

* * * * *